United States Patent [19]
Pifferi

[11] 3,755,317
[45] Aug. 28, 1973

[54] THIOAMIDES OF 4-SUBSTITUTED SYRINGIC ACID AND THEIR PREPARATION
[75] Inventor: Giorgio Pifferi, Milan, Italy
[73] Assignee: I.S.F., S.p.A., Milan, Italy
[22] Filed: Nov. 27, 1970
[21] Appl. No.: 93,460

[30] Foreign Application Priority Data
July 31, 1970    Italy.............................. 28164 A/70

[52] U.S. Cl..... 260/247.1, 260/239 BF, 260/243 B, 260/244 R, 260/268 R, 260/293.73, 260/306.7, 260/307 F, 260/309.7, 424/248
[51] Int. Cl............................................. C07d 87/46
[58] Field of Search....................... 260/247.1, 551 S, 260/559 R, 293.73, 326.5 S, 239 BF

[56] References Cited
UNITED STATES PATENTS
3,432,549    3/1969    Kasztreiner..................... 260/559 R Primary Examiner—Alex Mazel
Assistant Examiner—Jose Tovar
Attorney—Flynn & Frishauf

[57] ABSTRACT

New thioamides of 4-substituted zyringic acid are provided, which are characterized with respect to the corresponding amides in that they have a more prolonged effect. The new thioamides herein provided can be used in therapy showing a prolonged ataraxic or tranquilizing action upon the central nervous system without comprising the reflexes and the motorial coordination; furthermore, they show a very low toxicity, a favourable therapeutic coefficient and the absence of collateral effects on the circle.

2 Claims, No Drawings

THIOAMIDES OF 4-SUBSTITUTED SYRINGIC ACID AND THEIR PREPARATION

The present invention concerns new thioamides of 4-substituted syringic acid having activity on the central nervous system and the methods for their preparation. According to one of its aspects the invention comprises, more in particular, the derivatives of the formula:

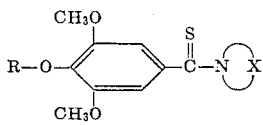

wherein R — $CH_3$—, $C_2H_5$—, $CH_3CO$— or $C_2H_5OCO$—, and

represents the residue of a saturated secondary heterocyclic base having 4,5,6 or 7 atoms in the ring, wherein X represents —$CH_2$—, —O—, —S— or —NH—. Examples of heterocyclic bases from which the

groups preferred in the thioamides of present invention may be derived are: pyrrolidine, 1,3-thiazolidine, imidazolidine, 1,2-oxazolidine, 1,3-oxazolidine, piperidine, piperazine, tetra-hydro-1,2-oxazine, tetra-hydro-1,3-oxazine, tetra-hydro-1,4-oxazine (morpholine), tetra-hydro-1,4-thiazane, perhydroazepine.

According to another aspect of the invention the herein described new thioamides can be used in therapy being endowed with a prolonged ataraxic or tranquilizing action upon the central nervous system without compromising the reflexes and the motorial coordination. Furthermore they show a very low toxicity, a favourable therapeutic coefficient, and the absence of collateral effects on the circle.

The new thioamides of the invention are characterized with respect to the corresponding amides in that they have a more prolonged effect. Although not wishing to bound the present invention to any theory, it can be supposed that this prolonged effect is to be put in relation with the greater resistance to hydrolysis which the thioamidic bond presents compared with the amidic bond.

The new compounds of the present invention can be prepared prevailingly according to one of the following synthesis methods:

1. An excess of a suitable 4-substituted syringic aldehyde is warm reacted with sulphur and a secondary heterocyclic base in the Willgeroth reaction conditions according to the following scheme:

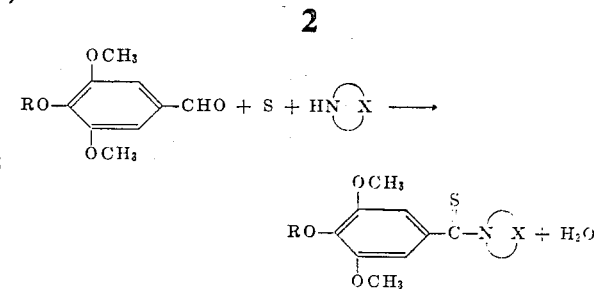

2. A second synthesis method consists in treating suitable tertiary amides of 4-substituted syringic acid with an excess of phosphorus pentasulphide according to the following scheme:

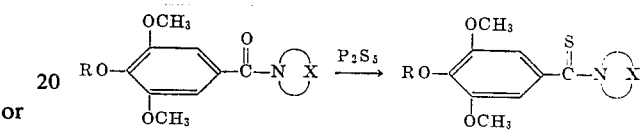

The sulphuration reaction is effected in an organic solvent, such as pyridine, at a temperature of from 70°C to 150°C, preferably by heating to 100°C and maintaining at this temperature for some hours.

3. A third variant considers the condensation of the thiobenzoic acid chloride, suitably substituted in the positions 3,4,5, with an excess of a secondary heterocyclic base according to the following scheme:

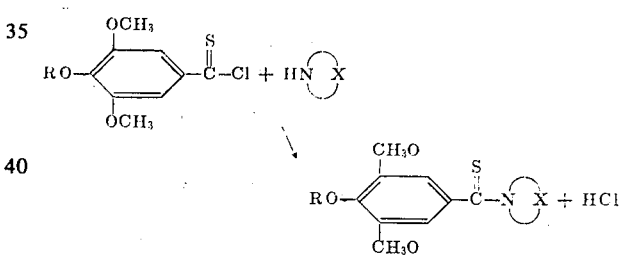

The invention will now be illustrated in detail as to its preparative aspect by the following examples which should not be considered as having any limitative character.

EXAMPLE 1

4-(3,4,5-trimethoxythiobenzoyl-tetrahydro-1,4-oxazine

A mixture of 3g. 3,4,5-trimethoxybenzaldehyde, 0.53 g. of precipitated sulphur and 0.95 g. of morpholine was heated at 140°C for 75 minutes. It was then cooled to room temperature and the residue was crystallized from ethanol giving a very good yield of the desired product, m.p. 138°–140°C. Infra-red spectrum (Nujol): 1580 and 1500 (benzenic ring stretching), 1110 (tetrahydro-1,4-oxazine) and 850 $cm^{-1}$ (aromatic $\gamma$ CH).

Analysis:
Calculated for $C_{14}H_{19}NO_4S$: C 56.55; H 6.44; N 4.71; S 10.78
Found: C 56.42; H 6.70; N 4.84; S 11.10

Example 2

4-(3,4,5-trimethoxythiobenzoyl)-tetrahydro-1,4-thiazane

A mixture of 4.1 g. 3,4,5-trimethoxybenzaldehyde, 0.72 g. precipitated sulphur and 1.57 g. tetrahydro-1,4-thiazane was heated to 140°C and kept at this temperature for one hour and a half. The raw residue was then treated as in example 1, giving a very good yield of the desired product, m.p. 163°–165°C. Infra-red spectrum (Nuj-ol): 1580 and 1490 (benzenic ring stretching), 1125 (C-O) and 845 cm$^{-1}$ (aromatic $\gamma$ CH).

Analysis:
Calculated for $C_{14}H_{19}NO_3S_2$: C 53.63; H 6.11; N 4.47; S 20.45
Found: C 53.26; H 6.20; N 4.56; S 20.90

EXAMPLE 3

3-(3,4,5-trimethoxythiobenzoyl)-1,3-thiazolidine

A mixture of 5g. 3-(3,4,5-trimethoxybenzoyl)-1,3-thiazolidine and 4 g. phosphorus pentasulphide in 50 ml. anhydrous pyridine was heated under stirring to 100°C and kept at this temperature for 6 hours. It was then cooled, poured into a diluted hydrochloric acid solution, extracted with chloroform, and the organic extracts were washed with a diluted sodium carbonate solution and then with water. After drying on sodium sulfate the solvent was distilled off and the residue was crystallized from isopropyl ether-ethanol 95:5. The desired product was obtained in a very good yield, m.p. 132°–134°C. Infra-red spectrum (Nujol): 1590 and 1500 (benzenic ring stretching), 1125 (C - 0 ether) and 832 (aromatic $\gamma$ CH).

Analysis:
Calculated for $C_{13}H_{17}NO_3S_2$: C 52.17; H 5.72; N 4.68; S 21.40
Found: C 52.33; H 5.77; N 4.60; S 21.23

EXAMPLE 4

2-(3,4,5-trimethoxythiobenzoyl)-1,2-oxazolidine

A mixture of 17 g. 2-(3,4,5-trimethosybenzoyl)-1,2-oxazolidine, and 14 g. phosphorus pentasulphide in 150 ml. anhydrous pyridine was heated to 100°C and kept under stirring at this temperature for five hours. It was cooled, poured into a diluted solution of hydrochloric acid and extracted three times with chloroform. The organic extracts were gathered and washed with a diluted solution of sodium carbonate, then with water and finally dried on sodium sulphate. The solvent was distilled off and the residue was subjected twice to chromatography on a disactivated silicagel column by eluting with chloroform-methanol 95:5. The unitray central fractions,after control on a plate (RF = 0.46 ) were extracted with methanol and the solvent was evaporated. The residue was crydtallized twice from methanol to give a good yield of the desired product, m.p. 105°–107°C. Infra-red spectrum (Nujol): 1590 and 1500 (benzenic ring stretching), 1120 (C - O ether) and 850 cm$^{-1}$ (aromatic $\gamma$ CH).

Analysis:
Calculated for $C_{13}H_{17}NO_4S$: C 55.10; H 6.05; N 4.94; S 11.31
Found: C 54.85; H 6.04; N 4.97; S 11.66

EXAMPLE 5

4-(4-acetoxy-3,5-dimethoxythiobenzoyl)-tetrahydro-1,4-thiazane

A mixture of 1 g. 4-(4-acetoxy-3,5-dimethoxybenzoyl)-tetrahydro-1,4-thiazane, 0.82 g. phosphorus pentasulphide and 10 ml. anydrous pyridine was heated under stirring to 100°C and kept ad this temperature for five hours,then cooled and poured into an excess of 10 percent hydrochloric acid. The mixture was repeatedly extracted with chloroform, the gathered extracts were washed with a diluted solution of $Na_2CO_3$, then with water and then they were dried on sodium sulfate. The solvent was distilled off and the residue was crystallized from ethanol and ethyl acetate. The desired product was obtained in good yields, m.p. 222°–224°C. infra-red spectrum (Nujol) : 1760 ( C = O ester), 1600 and 1500 (benznic ring stretching), 1135 (C - O) and 850 cm$^{-1}$ (aromatic $\gamma$ CH).

Analysis:
Calculated for $C_{15}H_{19}NO_4S_2$: C 52.69; H 5.61; N 4.10; S 18.77
Found: C 52.50; H 5.70; N. 4.00; S 19.01

The following tests were employed for the evaluation of the neuropsychic activity of the compounds of the invention on the animal: behaviour screening in the mouse according to Irwin (Gordon Res. Conf. Med. Chem. New London, N.H. - 1959), spontaneous motility in the mouse (Dunham and Mija - Am. Pharm. Assoc.; Sci. Ed. 46, 208, 1957), motorial coordination in the mouse, conditioned reflexes in the rat according to the Cook and Weidley method (Annals N.Y. Accad. Sci. 66, 740, 1957) modified by Mafii (j. Pharm. Pharmac., 11, 129, 1959). These methods are briefly described in the following.

The behaviour screening in the mouse consists in the systematic observation of groups of three mice per dose treated with standardized doses (10 – 30 – 60 – 100 300 – 1,000 mg/kg i.p.) of the test pharmaceuticals. The psychosedative, neurosedative, neurovegetative, miorelaxing activities and the acute toxicity were observed and evaluated.

The spontaneous motility in the mouse was evaluated by using groups of five mice treated with various doses, which mice were put in a cage having a floor made of steel bars through which very low voltage current was passed. In moving, the animals caused the closure of circuits with the paws and said movements were quantized, surveyed and registered by a special printing apparatus.

The motorial coordination was evaluated with the "rota rod" test, which consists in putting mice treated with various doses on a rod of rough plastic material rotating at a speed of 12 revolutions per minute. The controls remain on the rod for more than 3 minutes: the activity of the product on the motorial coordination was evaluated considering the time of permanence on the rod.

The action on the conditioned reflexes was evaluated by utilizing the "pole climbing avoidance test:" the apparatus is comprised by a soundproof box, the floor of which consists of metal bars connected to an electric stimulator. Moreover, the box contains a clock and a wooden stake, which is attached to the centre of the cover and comes down to 2 cm. from the floor. The stake represents the security area on which the rats may shelter to escape an electric shock. The experimental scheme to which the rats were subjected after introduction into the box was the following: 15 seconds of silence, 15 seconds of acustic stimulus, 30 seconds of associated acustic and electrical stimulus. The response of the animal interrupts this scheme. The animal's mounting on the stake during the period of silence was called CR₂ (secondary conditioned response), the mounting during the acustic stimulus was called CR₁ (primary conditioned response), and the mounting during the electric stimulation was called UR (unconditioned response). The CR₂ was interpreted as anxious response and for this evaluation the test was applied.

Some representative results are reported in the following Table.

TABLE

| Compound of the Example | Psycho-sedative activity ED₅₀, mg./kg. i.p. | Neuro-sedative activity ED₅₀, mg. kg. i.p. | Neuro-vegetative activity ED₅₀, mg./ kg. i.p. | Miore-laxing activity ED₅₀, mg./ kg. i.p. | DL₅₀ mouse. mg./kg. i.p. | Arterial pressor activity ED₅₀, mg./ kg. e.v. | Spontaneous motility ED₅₀, mg./ kg. o.s. | Rota rod ED₅₀. mg./kg. o.s. | Anxious response ED₅₀. mg. kg. | |
|---|---|---|---|---|---|---|---|---|---|---|
| | | | | | | | | | O.s. | I.p. |
| 1 | 100 | 300 | 1,000 | 300 | >1,000 | >30 | 165 | 200 | 30 | 20 |
| 3 | 250 | 400 | 1,000 | 500 | >1,000 | >30 | 600 | >600 | 40 | 25 |
| 4 | 200 | 500 | 400 | 300 | 700 | >30 | 220 | 220 | 35 | 15 |

From the examination of the data of the preceding Table it can be observed that the most important activity of the tested products is the antianxious activity observed by means of the "pole climbing avoidance test" in the rat, whereas the psychosedative and neurosedative activities are less important. The neurovegetative activity in the mouse is non-existent. Again in the mouse, the products show a scarce miorelaxing activity and do little influence the spontaneous activity and the motorial coordination. The described properties together with a low toxicity and a non-significant pressor activity (determined by measuring the arterial pressure in the anaesthesized cat), allow that these compounds be defined as drugs having selective-psychoactive character. The administration of the products can be effected orally or parenterally, and said products can be administered alone or in association with suitable pharmaceutical solid or liquid supports.

A very important fact which was evidenced by the tests made on the animals to evaluate the neuropsychic activity of the compounds of the present invention, consists in the observation that said activity becames higher in the passage from rodents to such animals as cat, dog, monkey. From this fact a very good possibility for using these compounds in man can be foreseen.

I claim:
1. A compound of the formula

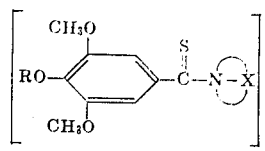

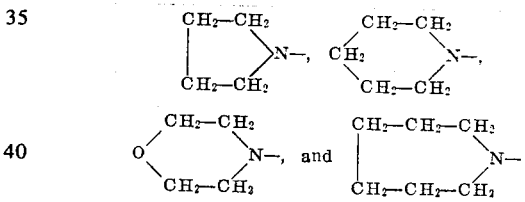

wherein R represents CH₃—, C₂H₅—, CH₃CO—, or C₂H₅OCO—; and

is selected from the group consisting of:

2. 4-(3,4,5-trimethoxythiobenzoyl)-tetrahydro-1,4-oxazine.

* * * * *

UNITED STATES PATENT OFFICE
CERTIFICATE OF CORRECTION

Patent No. 3,755,317     Dated August 28, 1973

Inventor(s) GIORGIO PIFFERI

It is certified that error appears in the above-identified patent and that said Letters Patent are hereby corrected as shown below:

Abstract, line 1: replace "zyringic" with --syringic-- .

Column 3, line 41, replace "trimethosylbenzoyl" with --trimethoxylbenzoyl-- .

Column 4, line 14: replace "benznic" with --benzenic-- .

Column 4, line 34: between "100" and "300", insert a dash ( - ).

Signed and sealed this 24th day of September 1974.

(SEAL)
Attest:

McCOY M. GIBSON JR.
Attesting Officer

C. MARSHALL DANN
Commissioner of Patents